June 26, 1956  D. M. PEARL  2,751,797
BUILT-UP PEDAL CONSTRUCTION
Filed June 18, 1952
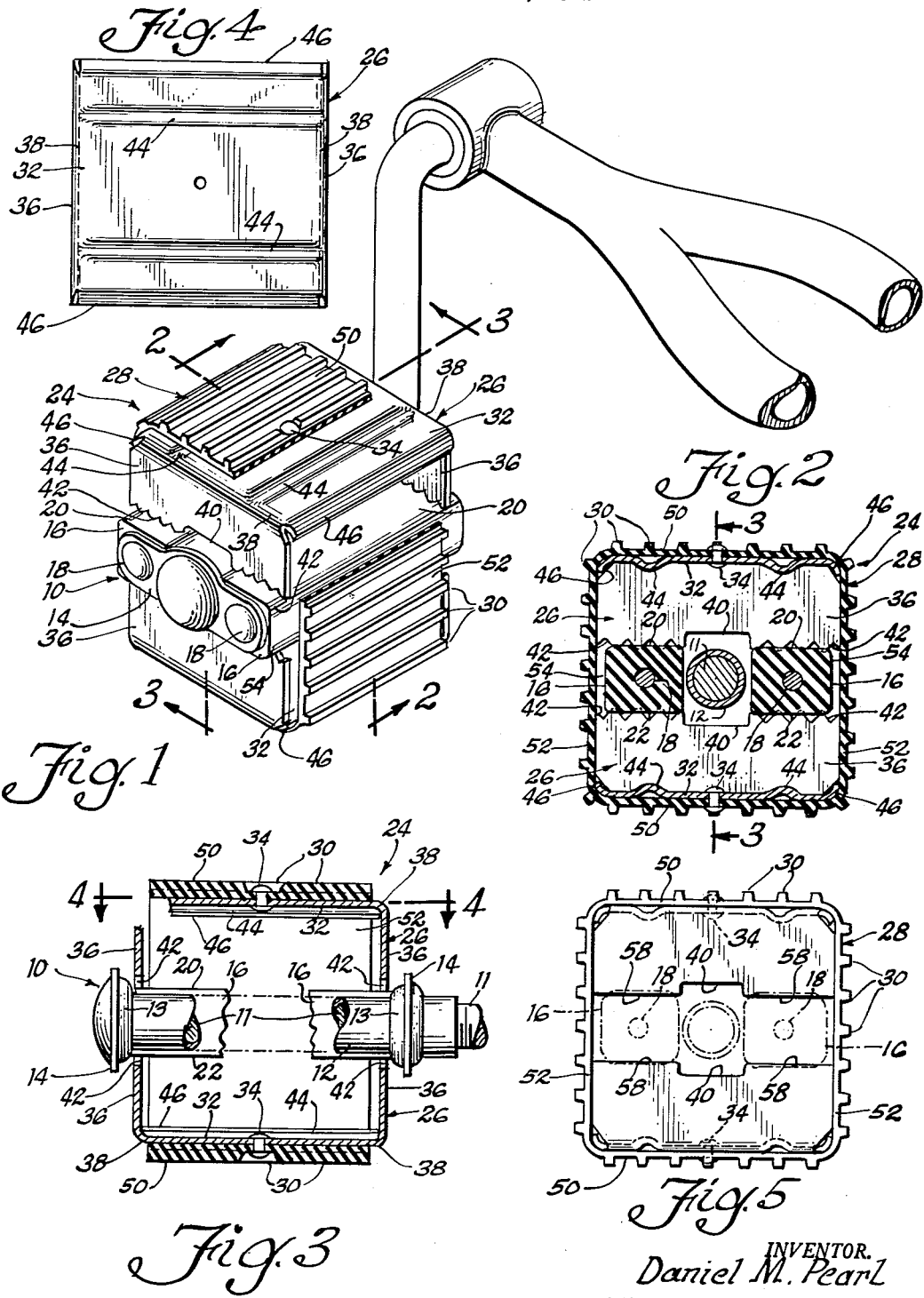
INVENTOR.
Daniel M. Pearl
BY
Louis Sheldon
Attorney United States Patent Office 2,751,797
Patented June 26, 1956

2,751,797
BUILT-UP PEDAL CONSTRUCTION
Daniel M. Pearl, Chicago, Ill., assignor to Darwin Products, Inc., Chicago, Ill., a corporation of Illinois
Application June 18, 1952, Serial No. 294,222
15 Claims. (Cl. 74—594.4)

This invention relates to pedals for bicycles, tricycles and the like, and is concerned more particularly with so-called built-up pedal construction.

In conventional built-up pedal construction, a pair of wooden blocks is arranged at opposite faces of a pedal assembly, the blocks being held together by screws or the like. The blocks thus must be drilled, and they must be held with the holes in alinement before the screws can be applied. Moreover, once any of the screws becomes loose, as is likely with continued use, the blocks also become loose and do not perform satisfactorily. Also, the blocks rest flat against the rubber cleats of the pedal, and there is thus a likelihood that they may slip along the cleats to an undesired position even though the screws may still be tight. To insure against such slippage may necessitate such a tightening of the screws as in some cases is sufficient to split one or both blocks.

It is an object of the invention to provide a unitary construction adapted to be slipped as a unit onto and hold itself securely in proper position on a pedal assembly.

Another object is to provide a device of the character referred to adapted to bite into the pedal assembly cleats and thus be retained in fixed relation thereto.

Further objects and advantages of the invention will appear as the description proceeds.

The invention will be better understood upon reference to the following description and accompanying drawing, in which:

Fig. 1 is an isometric view of one form of the invention mounted on a pedal.

Fig. 2 and 3 are sectional views taken as indicated by the lines 2—2 and 3—3, respectively, in Fig. 1.

Fig. 4 is a plan view of one of the channel-shaped elements of the device, taken as indicated by the line 4—4 in Fig. 3.

Fig. 5 is an end elevational view of a modification.

Referring now more particularly to the drawing, disclosing illustrative embodiments of the invention, there is shown at 10 a conventional pedal assembly comprising a pedal crank 11 surrounded by a sleeve 12 and journaled in bulged portions 13 at the centers of end plates 14, and rubber tread cleats 16 attached as by assembly bolts 18 to the plates and straddling the sleeve, the cleats being arranged for the purpose of the invention so that opposite faces 20 and 22 of the cleats lie in parallel planes as shown.

A build-up unit, when applied to the pedal assembly, enables the vehicle to be operated by a child too small to operate the vehicle without the unit, and when the child has grown sufficiently for his feet to conveniently reach the pedal assembly, the unit may be discarded.

A unit illustrative of one form of the invention is shown at 24, and comprises a pair of preferably identical sheet metal, plastic or other suitable preferably rigid channel members 26 disposed within an extruded or otherwise formed elastic rubber, plastic or other suitable preferably manually stretchable sleeve 28, preferably formed with external tread ribs 30, the webs 32 of the members being riveted as at 34 or otherwise suitably attached to the sleeve. The flanges 36 of each channel member 26 extend from the ends 38 of the web 32 toward the axis of the sleeve 28, and the inner margins of the flanges are centrally recessed as at 40 and serrated beyond the recesses as at 42 to bite into the cleats 16. The web 32 may be formed with one or more reinforcing indentations or ribs 44, and its side margins are preferably in the form of convexly bent lips 46 to avoid sharp outside edges. The width of each web 32 is preferably substantially equal to the width of the pedal assembly 10, and the distance between the flanges 36 of each channel member 26 is preferably somewhat less than the length of the pedal cleats 16. The recesses 40 are provided to insure clearing the inner bulged portions 13 which might otherwise interfere with the clamping action. In the arrangement shown, the inner bosses of the bulged portions 13 would not so interfere even if the recesses 40 were omitted, but conceivably the unit 24 might be mounted close enough to one or the other end plate 14 to bring about such interference, thus requiring readjustment of the unit, or a different pedal construction to which such a unit is applied may be so constructed that interference could not be avoided in the absence of the recesses. The recesses 40 thus render the unit 24 universally applicable to bicycle and tricycle pedals of different constructions, and once the unit is slipped into place it need not be adjusted.

When the sleeve 28 is unstretched, the sleeve walls 50 engaged with the channel webs 32 are so spaced that the distance between the teeth 42 of each channel member 26 from the teeth of the other member is substantially less than the depth or thickness, i. e., the distance between the faces 20 and 22, of the cleats 16. Accordingly, in order to properly assemble the unit 24 with the pedal assembly 10, the person charged with this duty must stretch the sleeve 28, by grasping and pulling the channel members 26 away from each other sufficiently to clear the pedal assembly 10, slip the unit onto the pedal assembly so that the serrated portions 42 are adjacent the respective surfaces 20 and 22 of the cleats 16, and then release the unit. This takes but a moment or two, the teeth 42 being pressed by the sleeve 28 into biting engagement with the faces 20 and 22 of the cleats 16, and the sleeve walls 52 extending outside the outermost faces 54 of the cleats. Thus the unit 24 is self-operative to prevent the teeth 42 from shifting in any direction relative to the pedal assembly 10.

When the unit 24 is assembled with the pedal assembly 10, the sleeve 28 is preferably of substantially square cross-section, so that its walls 50 and 52 provide four substantially identical tread surfaces.

The channel lips 46 and the outermost faces 54 of the cleats 16 afford backing for the rider's foot pressure applied to one or the other of the sleeve walls 52, and the channel webs 32 afford firm backing for the rider's foot pressure applied to one or the other of the sleeve walls 50.

When the child has outgrown the unit 24, the unit may be readily removed pursuant to stretching of the sleeve 28.

The cleat-biting edges of the channel flanges may be straight, i. e., unserrated, as shown at 58 in Fig. 5.

If desired, the recesses 40 may be omitted if the pedal assembly so warrants, so that each cleat-biting channel edge may be uninterrupted.

Various modifications may suggest themselves to those skilled in the art without departing from the spirit of my invention. Hence I do not wish to be restricted to the specific forms shown or uses mentioned, except to the extent indicated in the appended claims, which are to be interpreted as broadly as the state of the art will permit.

I claim:

1. In combination with a pedal assembly comprising a crank and rubber tread cleats at opposite sides of and along and mounted to rotate about said crank, a tread unit comprising a pair of identical rigid members engaging said cleats, each member having a first rectangular face remote from said cleats and two parallel end faces extending from opposite edges of the first face toward said cleats, said end faces of each member being respectively coplanar with said end faces of the other member, and an elastic rubber tread sleeve connected with and stretched between said members and substantially completely overlying said first faces, with the planes of said end faces disposed at the open ends of said sleeve, said members having sharp edges embedded by said sleeve in said cleats.

2. In combination with a pedal assembly comprising a crank and rubber tread cleats at opposite sides of and along and mounted to rotate about said crank, a tread unit comprising a pair of identical rigid channel members whose flanges are alike and whose webs are parallel to and spaced from the median plane of said assembly, said cleats being disposed between and engaging those edges of the flanges which are parallel to said webs, said webs being substantially rectangular, the flanges of each member being respectively substantially coplanar with the flanges of the other member, and an elastic rubber tread sleeve secured to and stretched about said members and embedding said flanges in said cleats, the open ends of said sleeve being disposed adjacent said flanges.

3. In combination with a pedal assembly comprising a crank and cleats at opposite sides of and along and mounted to rotate about said crank, a tread unit comprising a pair of identical rigid members, said cleats being disposed between said members, each member having a first rectangular face remote from said cleats and two identical substantially rectangular and parallel end faces extending from opposite edges of the first face toward said cleats, said end faces of each member being respectively substantially coplanar with said end faces of the other member, and an elastic rubber tread sleeve secured to and stretched about said members, said end faces being disposed at the open ends of said sleeve, said members having teeth biting into said cleats pursuant to the pressure of said sleeve.

4. In combination with a pedal assembly comprising a crank and rubber tread cleats at opposite sides of and along and mounted to rotate about said crank, a tread unit comprising a pair of identical channel members, said cleats being disposed between said members, the webs of said members being substantially rectangular and parallel to each other, the flanges of said members having serrated edges engaging said cleats, and elastic rubber tread sleeve means stretched about said members and imbedding said edges in said cleats.

5. A pedal build-up unit for a pedal assembly including rubber tread cleats, said unit comprising an elastic sleeve, a pair of rigid members within and assembled with said sleeve, each member having a rectangular portion secured to said sleeve and having relatively sharp inwardly projecting means, said sleeve having a rough tread surface and being stretchable to enable said unit to be slipped about the pedal assembly and imbed said means in the pedal assembly cleats.

6. A pedal build-up unit for a pedal assembly including rubber tread cleats, said unit comprising an elastic sleeve, a pair of rigid members within and assembled with said sleeve, each member having a rectangular portion secured to said sleeve and having relatively sharp inwardly projecting means disposed adjacent the ends, only, of said sleeve, said sleeve having a rough tread surface and being stretchable to enable said unit to be slipped about the pedal assembly and imbed said means in the pedal assembly cleats.

7. In a build-up unit for a pedal assembly, a rigid member having a substantially rectangular web and mutually facing flanges extending from said web, the edges of said flanges most remote from said web being sharp and lying in a plane parallel to said web and being centrally interrupted to clear the inner end bosses of a pedal assembly.

8. A pedal build-up unit comprising an elastic sleeve having a rough tread surface, a pair of rigid sheet metal members within and assembled with said sleeve, each member being channel-shaped, with its flanges projecting inward from its web and disposed adjacent the ends of said sleeve, said sleeve being stretchable to enable said unit to be slipped about a pedal assembly to locate the innermost edges of said flanges adjacent the pedal assembly cleats, said sleeve, when released, being operative to hold said edges in biting engagement with the pedal assembly cleats, said edges being intermediately recessed to clear the inner end bosses of the pedal assembly.

9. In a build-up unit for a pedal assembly, a rubber or the like elastic sleeve stretchable to a substantially greater than normal girth and formed externally with a complete peripheral series of projections parallel to the axis of and coextensive with said sleeve, and a pair of identical sheet metal channel members encompassed by said sleeve, the webs of said members being riveted to and substantially covered by said sleeve, the flanges of said members being disposed adjacent the ends of said sleeve and extending from said webs toward the axis of said sleeve, the inner margins of said flanges being intermediately recessed, the remainder of said margins being serrated, the outer surfaces of the free margins of said web being transversely convexly rounded.

10. The structure of claim 3, said sleeve so stretched being generally square in cross-section and being formed throughout its exterior surface with projections to afford traction with the rider's shoe irrespective of the part of said surface engaged by the rider's shoe.

11. The structure of claim 3, said members being intermediately recessed adjacent said cleats to clear the inner end bosses of the pedal assembly.

12. The structure of claim 3, said sleeve being formed substantially throughout its exterior with projections affording traction with the rider's shoe irrespective of the part of said exterior engaged by the rider's shoe.

13. The structure of claim 3, said sleeve so stretched being generally square in cross-section and being formed externally with a complete peripheral series of projections parallel to the axis of and substantially coextensive with said sleeve to afford traction with the rider's shoe irrespective of the part of the sleeve exterior engaged by the rider's shoe.

14. In combination with a pedal assembly, a build-up unit comprising a pair of rigid members, an elastic sleeve secured to and encompassing and axially substantially coextensive with said members, said sleeve being stretched and holding said members in tight engagement with the opposite faces of the pedal assembly, said sleeve so stretched being generally square in cross-section and being formed throughout its exterior with projections affording traction with the rider's shoe irrespective of the part of said exterior engaged by the rider's shoe.

15. In combination with a pedal assembly, a build-up unit comprising a pair of rigid members, an elastic sleeve secured to and encompassing and axially substantially coextensive with said members, said sleeve being stretched and holding said members in tight engagement with the opposite faces of the pedal assembly, said sleeve so stretched being generally square in cross-section and being formed externally with a complete peripheral series of projections parallel to the axis of and substantially coextensive with said sleeve to afford traction with the rider's shoe irrespective of the part of the sleeve exterior engaged by the rider's shoe.

References Cited in the file of this patent

UNITED STATES PATENTS

| | | |
|---|---|---|
| 506,276 | Schultz | Oct. 10, 1893 |
| 973,065 | Pawsat | Oct. 18, 1910 |
| 1,972,701 | Carlson et al. | Sept. 4, 1934 |
| 2,548,988 | McDonald | Apr. 17, 1951 |